United States Patent [19]

Kashihara et al.

[11] Patent Number: 5,059,505

[45] Date of Patent: Oct. 22, 1991

[54] RESIN PARTICLES

[75] Inventors: Akio Kashihara, Hirakata; Chikayuki Otsuka, Kadoma; Naoya Yabuuchi, Hirakata, all of Japan

[73] Assignee: Nippon Paint Co., Ltd., Osaka, Japan

[21] Appl. No.: 569,526

[22] Filed: Aug. 20, 1990

Related U.S. Application Data

[63] Continuation of Ser. No. 263,247, Oct. 27, 1988, abandoned.

[30] Foreign Application Priority Data

Oct. 30, 1987 [JP] Japan .................... 62-277068

[51] Int. Cl.$^5$ ............................. G03G 9/087
[52] U.S. Cl. ..................... 430/110; 430/109; 430/111; 430/137; 524/904; 525/934
[58] Field of Search ............... 430/109, 110, 111, 137; 524/904; 525/934

[56] References Cited

U.S. PATENT DOCUMENTS

| | | | |
|---|---|---|---|
| 4,139,483 | 2/1979 | Williams et al. | 430/110 |
| 4,388,396 | 6/1983 | Nishibayashi et al. | 430/110 X |
| 4,430,408 | 2/1984 | Sitaramiah | 430/109 X |
| 4,517,272 | 5/1985 | Jadwin et al. | 430/110 |
| 4,758,491 | 7/1988 | Alexandrovich et al. | 430/109 X |

FOREIGN PATENT DOCUMENTS

| | | | |
|---|---|---|---|
| 0275899 | 7/1988 | European Pat. Off. | |
| 53-133447 | 11/1978 | Japan | 430/110 |
| 59-152446 | 8/1984 | Japan | 430/137 |
| 2161170 | 1/1986 | United Kingdom | |

*Primary Examiner*—Roland Martin
*Attorney, Agent, or Firm*—Wenderoth, Lind & Ponack

[57] ABSTRACT

Disclosed is a process for preparing polymer particles suitable for electrophotographic toner. The substantially spherical resin particles have a weight average particle size of 1 to 30 microns and contain a carbon atom as main component, a silicon atom in an amount of $1 \times 10^{-1}$ to 7% by weight and/or a fluorine atom in an amount of $1 \times 10^{-2}$ to 2% by weight. The particles are prepared by polymerizing a polymerizable monomer in an organic solvent having a higher solubility parameter (SP value) than the resultant polymer by at least 1.0 in the presence of a dispersion stabilizer which is soluble in said organic solvent and which has a dialkylsiloxane bond and/or a fluorine atom, and then removing said organic solvent.

4 Claims, No Drawings

RESIN PARTICLES

This application is a continuation of now abandoned application, Ser. No. 07/263,247 filed on Oct. 27, 1988.

FIELD OF THE INVENTION

The present invention relates to resin particles suitable for column chromatography, clinical diagnosis and toner for electrophotography.

BACKGROUND OF THE INVENTION

Resin particles have become important and been used for many applications.

The resin particles are produced by many methods. One of the most common methods is a grinding method wherein resin particles are prepared by blending a thermoplastic resin at a melting condition and then grinding. There are some applications which require employment spherical resin particles. The resin particles obtained by the grinding method, however, are too flat to apply such applications.

A method recently proposed includes a soap-free polymerization method or a seed-emulsion polymerization method. These methods produce spherical resin particles, but, in order to obtain particles having a particle size of 1 to about 50 microns, it is required to repeat the polymerization reaction several times. The resin particles thus obtained may raise blocking. Also, the system of preparing the particles is electrically stabilized, so that the obtained particles may have strong electric charge. The particles are limited in their applications because of the strong charges.

A suspension polymerization method may also be employed, but the particle size distribution of the obtained particles is very broad and blocking often occurs.

When the resin particles are used for toner which is one of their main usages, blocking has to be effectively prevented. In order to prevent the blocking of toner, it has been proposed to have a high molecular weight or glass-transition temperature of the resin. This, however, raises the fixing temperature and causes cold offset.

SUMMARY OF THE INVENTION

The present invention provides resin particles having a narrow particle size distribution and effectively avoiding blocking, which are especially useful for electrophotographic toner. Accordingly, the present invention provides resin particles substantially spherical in shape having a weight average particle size of 1 to 30 microns and containing a carbon atom as main component, a silicon atom in an amount of $1 \times 10^{-1}$ to 7% by weight and/or a fluorine atom in an amount of $1 \times 10^{-2}$ to 2% by weight; the particles being prepared by polymerizing a polymerizable monomer in an organic solvent having a higher solubility parameter (SP value) than the resultant polymer by at least 1.0 in the presence of a dispersion stabilizer which is soluble in said organic solvent and which has a dialkylsiloxane bond and/or a fluorine atom, and then removing said organic solvent.

DETAILED DESCRIPTION OF THE INVENTION

The resin particles of the present invention are substantially spherical in shape. By the term "substantially spherical" herein is meant that at least 80% by weight of the particles have a particle distortion of 4/5 to 1, thus approaching the shape of a sphere from a particle distortion of 4/5. The particle distortion is determined by measuring the maximum particle size and the minimum particle size by using a scanning electron microscope and calculating the minimum particle size divided by the maximum particle size. Accordingly, a complete sphere equals a value of 1. The resin particles have a weight average particle size of 1 to 30 microns. If the particle size is more than 30 microns, the particles have defects in separation properties for chromatography and poor image resolution for a toner. The particle sizes of less than 1 micron are too small to apply to some usages. The particles also contain a carbon atom as main component, a silicon atom in an amount of $1 \times 10^{-1}$ to 7% by weight, preferably $2 \times 10^{-1}$ to 5% by weight, and/or a fluorine atom in an amount of $1 \times 10^{-2}$ to 2% by weight, preferably $2 \times 10^{-1}$ to 10% by weight. If the atom content is less than the minimum value, the particles are insufficient in blocking resistance, offset resistance and cleaning properties. If the content is more than the maximum value, the particles are insufficient in fixing properties and non-adhesiveness. The particles are prepared by the following process.

In the preparation of the resin particles, a polymerization is carried out in a nonaqueous solvent, i.e. in an organic solvent having a solubility parameter more than that of the obtained resin particles by not less than 1, preferably 2 to 10. The "solubility parameter" herein is obtained from "Polymer Handbook" by H Burrel, Wiley-Interscience, p. IV-337 to IV-348. The organic solvent to be employed includes ketones, such as acetone and cyclohexanone; dioxane; acetonitrile; dimethylformamide; ether alcohols, such as ethylene glycol monomethyl ether, ethylene glycol monoethyl ether, ethylene glycol monobutyl ether, propylene glycol monomethyl ether, propylene glycol monoethyl ether, propylene glycol monobutyl ether, diethylene glycol monomethyl ether, diethylene glycol monoethyl ether, diethylene glycol monobutyl ether, dipropylene glycol monomethyl ether and dipropylene glycol monoethyl ether; alcohols, such as methanol, ethanol, isopropanol, n-butanol, i-butanol, t-butanol, n-hexanol, cyclohexanol, ethylene glycol, propylene glycol and dipropylene glycol; and the like. Preferably, the solvent contains the alcohols and/or ether alcohol in an amount of not less than 50% by weight, more preferably not less than 80% by weight.

The insertion of the silicon atom or the fluorine atom into the resin particles is made by polymerizing the polymerizable monomer in the presence of the dispersion stabilizer which is soluble in said organic solvent and which has a dialkylsiloxane bond and/or a fluorine atom. A polysiloxane compound and a polyolefin fluoride which are conventionally used are generally soluble in a nonpolar solvent, but few of them are soluble in the above mentioned organic solvent, such as alcohols or ether alcohols. The dispersion stabilizer can be selected from these few silicon compounds having a dialkylsiloxane bond which are soluble in the organic solvent.

Examples of the dispersion stabilizers having a dislkylsiloxane bond are compounds have the following formula:

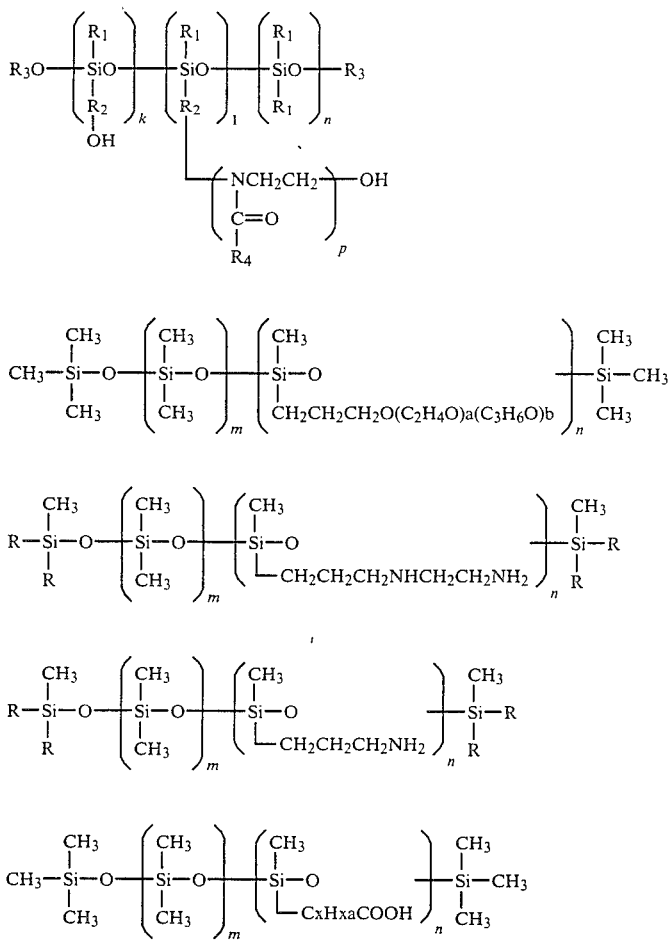

wherein $R_1$ represents an alkyl group, $R_2$ represents an alkylene group, $R_3$ represents a hydrogen atom, an alkyl group or a silyl group, $R_4$ represents an alkyl group, R represents a methyl group or a methoxy group, and a, b, n, m, k, l, p and x are positive integers.

The dispersion stabilizer of the present invention may be prepared by introducing a fluoroalkylsilane into a known dispersion stabilizer having a hydroxyl group, or by copolymerizing a monomer having a silicon atom or a fluorine atom with another monomer. Examples of the known dispersion stabilizers having a hydroxyl group are a hydroxyl group-containing polyacryl, polyvinyl alcohol, polyvinyl butyral, hydroxyethylcellulose, hydroxypropylcellulose, saponified vinyl pyrrolidone-vinyl acetate copolymer and the like. Examples of the fluoroalkylsilanes are $CF_3CH_2CH_2Si(OCH_3)_3$
$CF_3CH_2CH_2SiCl_3$
$CF_3(CF_2)_5CH_2CH_2SiCl_3$
$CF_3(CF_2)_5CH_2CH_2Si(OCH_3)_3$
$CF_3(CF_2)_7CH_2CH_2SiCl_3$
$CF_3(CF_2)_7CH_2CH_2Si(OCH_3)_3$
$CF_3(CF_2)_7CH_2CH_2SiCH_3Cl_3$
$CF_3(CF_2)_7CH_2CH_2SiCH_3(OCH_3)_2$ and the like.

The monomer having a silicon atom to be copolymerized includes one having the following formula:

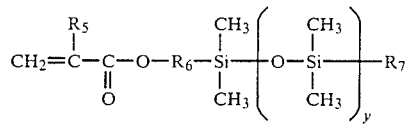

wherein $R_5$ represents H or $CH_3$, $R_6$ represents an alkylene group, $R_7$ represents an alkyl group or a phenyl group, and y is an integer of 1 to 5, such as

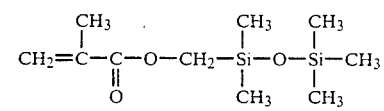

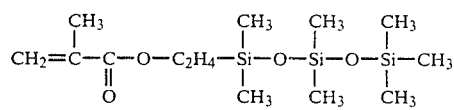

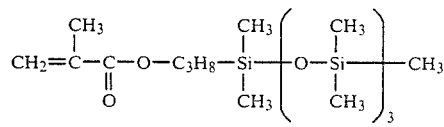

-continued

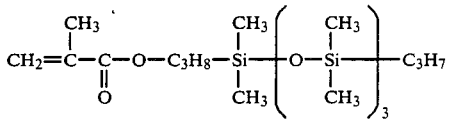

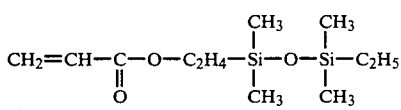

and the like. The monomer having a fluorine atom includes a compound represented as follow:

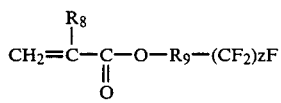

wherein $R_8$ represents H or $CH_3$, $R_9$ represents an alkylene group having 1 to 3 carbon atoms, and z is an integer of 1 to 13. The other monomer to be copolymerized includes (meth)acrylic acid, a (meth)acrylate, a (meth)acrylamide, an aromatic compound, vinyl pyrralidone and the like. The copolymerization can be carried out in a usual manner.

According to the present invention, the resin particles are prepared by polymerizing the polymerizable monomer in the presence of the dispersion stabilizer. The amount of the dispersion stabilizer may be varied because of desired properties, such as particle size, particle distortion, polymerizability, dispersibility of a coloring agent, blocking resistance and offset resistance, but generally is from 1 to 20% by weight based on the amount of the polymerizable monomer. The silicon and/or fluorine content of the dispersion stabilizer also is not limited, but preferably is 1 to 35% by weight for silicon and 0.1 to 10% by weight for fluorine in consideration of some properties, such as solubility in the organic solvent, polymerizability and a balance of blocking resistance and offset resistance. Both silicon and fluorine can be present in the dispersion stabilizer and another known dispersion stabilizer may be employed in combination with the above dispersion stabilizer. They can be selected for obtaining desired properties and the selection is known to the art.

The polymerizable monomer used for preparing the resin particles of the present invention includes an alkyl (meth)acrylate, such as methyl acrylate, methyl methacrylate, ethyl acrylate, n-butyl acrylate, n-butyl methacrylate, 2-ethylhexyl acrylate and 2-ethylhexyl methacrylate; a hydroxyl group-containing monomer, such as 2-hydroxyethyl acrylate, hydroxypropyl acrylate, 2-hydroxyethyl methacrylate, hydroxypropyl methacrylate, hydroxybutyl acrylate, hydroxybutyl methacrylate, allyl alcohol and methallyl alcohol; polymerizable amides, such as acrylamide and methacrylamide; polymerizable nitriles, such as acrylonitrile, and methacrylonitrile; glycidyl (meth)acrylate; an aromatic vinyl compound, such as styrene and vinyl toluene; an alpha-olefin, such as ethylene and propylene; a vinyl compound, such as vinyl acetate and vinyl propyonate; a diene compound, such as butadiene and isoprene; a carboxyl group-containing monomer, such as acrylic acid, methacrylic acid, crotonic acid, itaconic acid, maleic acid, fumaric acid, monobutyl itaconate, monobutyl maleate; a phosphoric acid group-containing monomer, such as acidphosphoxyethyl methacrylate, acidphosphoxypropyl methacrylate, 3-chloro-2-acidphosphoxypropyl methacrylate; a sulfonic acid group-containing monomer, such as 2-acrylamide-2-methylpropanesulfonic acid ahd 2-sulfoethyl methacrylate; a nitrogen-containing alkyl (meth)acrylate, such as dimethylaminoethyl acrylate and diethylaminoethyl methacrylate; a derivative therefrom, such as a reaction product of the hydroxyl group-containing monomer with an isocyanate compound and a reaction product of a carboxyl group-containing monomer with a glycidyl group-containing compound; and the like. For imparting negative charges, the carboxylic acid-containing monomer, phosphoric acid group-containing monomer and sulfonic acid group-containing monomer are preferred. For positive charges, the nitrogen containing monomer is preferred.

In addition to the above polymerizable monomer, a polyethylenic monomer may be employed to adjust the glass transition temperature of the polymer particles and the molecular weight. Examples of the polyethylenic monomers are ethylene glycol diacrylate, diethylene glycol dimethacrylate, triethylene glycol dimethacrylate, tetraethylene glycol dimethacrylate, 1,3-butylene glycol dimethacrylate, trimethylolpropane triacrylate, trimethylolpropane trimethacrylate, 1,4-butanediol diacrylate, neopentyl glycol diacrylate, 1,6-hexanediol diacrylate, pentaerythritol diacrylate, pentaerythritol triacrylate, pentaerythritol tetraacrylate, pentaerythritol dimethacrylate, pentaerythritol trimethacrylate, pentaerythritol tetramethacrylate, glycelol dimethacrylate, glycelol diacrylate, glycelol acryloxy dimethacrylate, 1,1,1-trishydroxymethylethane diacrylate, 1,1,1-trishydroxymethylethane triacrylate, 1,1,1-trishydroxymethylethane dimethacrylate, 1,1,1-trishydroxymethylethane triacrylate, 1,1,1-trishydroxymethylpropane diacrylate, 1,1,1-trishydroxymethylpropane triacrylate, 1,1,1-trishydroxymethylpropane dimethacrylate, 1,1,1-trishydroxymethylpropane trimethacrylate, triallyl cyanurate, triallyl isocyanurate, triallyl trimellitate, diallyl terephthalate, diallyl phthalate, divinylbenzene, diisopropenylbenzene or a mixture thereof. The polyethylenic monomer may be present in an amount of 0.2 to 50% by weight based on the total monomer amount. However, amounts of more than 50% by weight can be used. It is preferred that the polyethylenic monomer may be added at the end of the polymerization process. This imparts a construction having a highly crosslinked shell and a core crosslinked not so much. The construction is very suitable for a toner particle.

The polymerization reaction can be generally carried out using polymerization initiator. The initiator is not limited, but includes a peroxide, such as benzoyl peroxide, di-t-butyl peroxide, cumene hydroperoxide or t-butylperoxy-2-ethylhexanoate; an azo compound, such as azobisisobutyronitrile, 2,2-azobis(2,4-dimethylvaleronitrile), 2,2'-azobis(4-methoxy-2,4-dimethylvaleronitrile or dimethyl-2,2'-azobisisobutyrate; and the like. A combination of the above initiators can be employed. The amount of the initiator is within the range of 0.1 to 10% by weight, preferably 0.2 to 7% by weight based on total monomer amount.

During polymerization, a coloring agent can be formulated if necessary. The coloring agent includes an inorganic pigment, an organic pigment and a dye, for example, carbon black, Cinquacia red, disazo yellow, Carmine 6B, Direct Yellow, Direct Blue, phthalocyanine blue, quinacridone red, azo type metal complex green, azine compound, stearic acid modified azine compound, oleic acid modified azine compound (such as nigrosine), quaternary ammonium base compound, phthalocyanine green halide, flavanthrone yellow, perylene red, an azo compound having metal (such as copper, zinc, lead, iron and the like). The coloring agent may be present in an amount of 3 to 50% by weight based on total monomer amount. It is preferred that the pigment is grafted by a polymer on the surface. A method for grafting is known to the art, for example Japanese Patent Publication (unexamined) No. 23133/1980. When the coloring agent is the organic dye, it is desired to be oil-soluble and to have high solubility to nonpolar solvent (such as a hydrocarbon solvent). It is more preferred that the dye has a free radical reactive double bond. Such a dye can be obtained by reacting a dye having an active hydrogen, such as a hydroxyl group, a thiol group and a primary or secondary amino group with an isocyanatoalkyl (meth)acrylate (meth)acryloyl isocyanate or (meth)acrylic chloride. The dye is copolymerized with the polymer particle to uniformly disperse in it. This is very important for a color toner. In case where the coloring agent is the pigment, it is preferred to use a pigment having a different electron charge from the particle forming polymer or the dispersion stabilizer, because the pigment is uniformly dispersed in the particle.

According to the present invention, an additive may be formulated in the particles. Examples of the additives are magnetic powder, such as magnetite and ferrite; polyethylene wax; polypropylene wax; a silicon compound; and the like. The amount of the additive is 0.1 to 5% by weight based on total polymerizable monomer.

The conditions for polymerization are not specifically limited, but generally the polymerization is conducted at a temperature of 50° to 150° C. in a nitrogen atmosphere.

According to the present invention, since the dispersion stabilizer contains a silicon atom or a fluorine atom which has a low cohesive energy and reduces surface tension, the blocking of the resin particles is effectively prevented even when the particles are very fine and therefore it makes it possible to obtain resin particles having a low glass-transition temperature. The resin particles are very suitable for an electrophotographic toner or a liquid developer, because they have poor adhesiveness to a photosensitive member or a carrier and good releasability to a fixing roller. Offset resistance and cleaning properties are also improved to obtain an excellent image.

EXAMPLES

The present invention is illustrated by the following examples, which are not to be construed as limiting the present invention to their details.

REFERENCE EXAMPLE 1

Preparation of a Dispersion Stabilizer Having a Dimethylsiloxane Bond

Ten grams of an alcoholic hydroxyl group-containing polysiloxane represented by the formula;

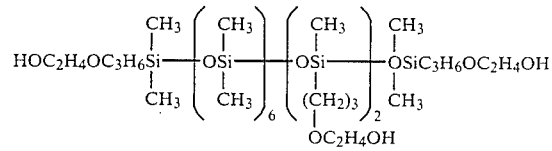

was dissolved in 30.0 ml of dried chloroform and 20.0 ml of pyridine, to which 3.4 g of 4-toluenesulfonyl chloride was added while maintaining at a temperature of less than 10° C., and the mixture was allowed to stand with mixing overnight. Chloroform and pyridine were distilled away under a reduced pressure and extracted with ether. The extracted organic layer was subjected to distillation to obtain a viscous sulfonate of polysiloxane. Then, 4.0 g of this polysiloxane and 8.0 g of 2-methyl-2-oxazoline were dissolved in 8.0 ml of acetonitrile and allowed to react at 90° C. for 5 hours in a nitrogen atmosphere. The heat residue of the obtained solution at 105° C. for 3 hours was approximately equal to a theoretical value and it was confirmed that 100% of 2-methyl-2-oxazoline was reacted. After cooling, a tosylate anion was removed by using a hydroxyl group type anion-exchange resin to obtain poly(N-acetylethyleneimine) graft polysiloxane as transparent light yellow polymer having no fluidity. The silicon content of the polymer was determined by fluorescent X-ray to be 8.1% by weight.

REFERENCE EXAMPLE 2

Preparation of a Dispersion Stabilizer Having a Fluorine Atom

A one liter separable flask equipped with a thermometer, a condenser, an oxygen introducing inlet and a stirrer was charged with 60 parts by weight of hydroxypropylcellulose, 560 parts by weight of dioxane, 0.03 parts by weight of dibutyltin dilaurate and heated to 80° C. After completely dissolving all contents, 6.8 parts by weight of a fluoroalkylsilane represented by $CF_3(CF_2)_7CH_2CH_2Si(OCH_3)_3$ was dissolved in 20 parts by weight of dioxane and added dropwise to the flask over 30 minutes. After maintaining at 80° C. for 4 hours, dioxane was distilled under a reduced pressure to obtain a dioxane solution of a fluorine-containing hydroxypropylcellulose (non-volatile content = 20%). The fluorine content of the polymer was determined by fluorescent X-ray to be 5.7% by weight.

REFERENCE EXAMPLE 3

Preparation of a Dispersion Stabilizer Having a Fluorine Atom

The same flask as in Reference Example 2 was charged with 90 parts by weight of polyvinyl acetate having a polymerization degree of 2,000, a saponification degree of 26% and a terminal mercapto concentration of $3 \times 10^{-6}$ mol/g (available from Kuraray Co. Ltd. as X-5821), 480 parts by weight of dioxane, 0.04 parts by weight of dibutyltin dilaurate and heated to 80° C. After completely dissolving the contents, 6.9 parts by weight of a fluoroalkylsilane represented by $CF_3(CF_2)_5CH_2CH_2Si(OCH_3)_3$ was dissolved in 20 parts by weight of dioxane and added dropwise to the flask over 30 minutes. After maintaining at 80° C. for 4 hours, dioxane was distilled under a reduced pressure to obtain a dioxane solution of a fluorine-containing hydroxypropylcellulose (non-volatile content=25%). The fluorine content of the polymer was determined by fluorescent X-ray to be 3.5% by weight.

REFERENCE EXAMPLE 4

Preparation of a Dispersion Stabilizer Having a Fluorine Atom

A reaction vessel was charged with 100 parts by weight of 2-hydroxyethyl methacrylate, 145 parts by weight of n-butyl methacrylate, 45 parts by weight of acrylic acid and 6.1 parts by weight of thiolacetic acid and heated to 60° C. in a nitrogen atmosphere. Then, 10 parts by weight of an acrylic acid solution containing 0.3 parts by weight of 2,2'-azobisisobutylonitrile was added to the reaction vessel to start polymerizing. The polymerization degree after 2 hours was 35.2%. After completing the polymerization, the reaction mixture was poured into toluene to settle the polymer. Reprecipitation was repeated three times with a methanol/toluene mixture to remove unreacted acrylic acid, 2-hydroxyethyl methacrylate and n-butyl methacrylate. Next, 90 g of the obtained polymer was dissolved in 100 g of methanol and 50 ml of 1N methanol hydrochloric acid was added to react at 40° C. for 5 hours. It was then poured into toluene to settle the polymer which was filtered, dried and reprecipitated twice with an ice/acetone mixture to obtain a polyacrylic acid having a terminal mercapto group.

A flask was charged with 120 parts by weight of the mercapto group-containing polyacrylic acid obtained above, 480 parts by weight of dioxane, 0.02 parts by weight of dibutyltin dilaurate and heated to 80° C. After completely dissolving the contents, 10.3 parts by weight of a fluoroalkylsilane represented by $CF_3(CF_2)_7CH_2CH_2Si(OCH_3)_3$ was dissolved in 30 parts by weight of dioxane and added dropwise to the flask over 30 minutes. After maintaining at 80° C. for 4 hours, dioxane was distilled under a reduced pressure to obtain a dioxane solution of a fluorine-containing polyacrylic acid (non-volatile content=50%). The fluorine content of the polymer was determined by fluorescent X-ray to be 4.4% by weight.

REFERENCE EXAMPLE 5

Preparation of a Dispersion Stabilizer Having a Silicon Atom

The same flask as in Reference Example 2 was charged with 90 parts by weight of butyl acetate and heated to 100° C. A mixture was prepared from 304 parts by weight of methyl methacrylate, 129 parts by weight of ethyl acrylate, 25 parts by weight of dimethylaminoethyl methacrylate, 40 parts by weight of heptamethylsiloxanylethyl methacrylate and 3 parts by weight of azobisisobutylonitrile and added dropwise to the flask over 3 hours. After 30 minutes from the completion of the addition, a mixture of 12 parts by weight of acetone and 0.5 parts by weight of azobisisobutylonitrile was added dropwise and kept at 100° C. for 2 hours. After cooling, the silicon content of the polymer was determined by fluorescent X-ray to be 1.9% by weight.

REFERENCE EXAMPLE 6

Preparation of a Dye Having a Free Radical Polymerizable Double Bond

In the same apparatus as Reference Example 1, 76 parts by weight of Solvent Red 24 and 450 parts by weight of tetrahydrofuran were dissolved at room temperature. A mixture of 22.2 parts by weight of methacryloyl isocyanate with 50 parts by weight of tetrahydrofuran was added dropwise for 30 minutes and kept at room temperature for 2 hours. The existence of a methacryloyl group and the disappearance of an isocyanate group was identified by IR and NMR. Tetrahydrofuran was, then, removed under a reduced pressure to obtain a red dye having a free radical polymerizable double bond.

REFERENCE EXAMPLE 7

Preparation of a Dye Having a Free Radical Polymerizable Double Bond

A blue dye having a free radical polymerizable double bond was obtained as generally described in Reference Example 8, with the exception that 59.2 parts by weight of Disperse Blue 3 and 22.2 parts by weight of methacryloyl isocyanate were reacted in a water bath with ice.

EXAMPLE 1

A one liter separable flask equipped with a thermometer, a condenser, a nitrogen introducing tube and a stirrer was charged with 7.2 parts by weight of the dispersion stabilizer of Reference Example 1 and 600 parts by weight of ethanol and heated to 80° C. After completely dissolving the contents, a mixture containing 104 parts by weight of styrene, 4 parts by weight of methacrylic acid, 12 parts by weight of diisopropenylbenzene and 4.8 parts by weight of benzoylperacetate was added and reacted at 70° C. for 24 hours and the reaction was terminated. The reaction product was centrifuged and rinsed with methanol to obtain white powder. When the powder was observed by an electron microscope, spherical polymer particles having a narrow particle size distribution of 3 to 4 microns were observed. The powder has a weight average particle size of 3.8 microns when measured by a coulter counter and a standard deviation of 0.22 microns. The powder was dissolved in tetrahydrofuran and the silicon atom content of the dissolved portion was determined by fluorescent X ray to be 0.4% by weight.

EXAMPLE 2

The same one liter separable flask as in Example 1 was charged with 12 parts by weight of a polyether-modified silicone oil available from Sin-Etsu Silicone Co. Ltd., 480 parts by weight of isopropanol and 120 parts by weight of water and heated to 70° C. After completely dissolving the contents, a mixture containing 116 parts by weight of styrene, 4 parts by weight of 2-hydroxyethyl methacrylate, and 2.4 parts by weight of azobisisobutyronitrile was added and reacted at 70° C. for 18 hours and the reaction was terminated. The reaction product was centrifuged to obtain powder. When the powder was observed by an electron microscope, spherical polymer particles having a narrow particle size distribution of 2 to 3 microns were observed. The powder has a weight average particle size of 2.4 microns when measured by a coulter counter, and a standard deviation of 0.17 microns. The silicon atom content of the powder was determined by fluorescent X ray to be 0.9% by weight.

EXAMPLE 3

The same flask as in Example 1 was charged with 10.5 parts by weight of the dispersion stabilizer of Reference Example 2, 119 parts by weight of isopropanol and 476 parts by weight of 2-ethoxyethanol and heated to 90° C. A mixture containing 90 parts by weight of styrene, 8.7 parts by weight of 2-ethylhexyl acrylate,, 6.3 parts by weight of divinylbenzene and 3.2 parts by weight of t-butylperoxy-2-ethylhexanoate was added for 2 hours and kept at 90° C. for 22 hours and the reaction was terminated. It was then treated as generally described in Example 1 and observed by an electron microscope to find spherical particles having a particle size of 30 to 40 microns. The powder has a weight average particle size of 37 microns when measured by a coulter counter, and a standard deviation of 1.1 micron.

EXAMPLE 4

The same flask as in Example 1 was charged with 35 parts by weight of the dispersion stabilizer of Reference Example 3, 426 parts by weight of t-butanol and 107 parts by weight of 2-methoxypropanol and heated to 90° C. After completely dissolving the contents, a mixture containing 90 parts by weight of styrene, 18 parts by weight of n-butyl acrylate, 1.2 parts by weight of benzoyl peroxide and 6.0 parts by weight of azobishexanenitrile was added and kept at 90° C. for 10 hours. It was then treated as generally described in Example 1 and observed by an electron microscope to find spherical particles having a particle size of 6 to 7 microns. The powder has a weight average particle size of 6.8 microns when measured by a coulter counter and a standard deviation of 0.29 micron. The fluorine atom content of the powder was determined by fluorescent X ray to be 0.2% by weight.

EXAMPLE 5

The same flask as in Example 1 was charged with 11.3 parts by weight of the dispersion stabilizer of Reference Example 1, 378 parts by weight of ethanol and 252 parts by weight of 3-methyl-3-methoxybutanol and heated to 70° C. After completely dissolving the contents, a mixture containing 86 parts by weight of styrene, 15.5 parts by weight of 2-ethylhexyl acrylate, 2.3 parts by weight of dimethylaminoethyl methacrylate, 0.7 parts by weight of diisopropenylbenzene, 8 parts by weight of the dye of Reference Example 8 and 2.8 parts by weight of azobisisobutyronitrile was added and reacted at 70° C. for 24 hours and the reaction was terminated. It was then treated as generally described in Example 1 to obtain red powder which was observed by an electron microscope to find spherical particles having a particle size of 6 and 8 microns. The powder has a weight average particle size of 7.2 microns when measured by a coulter counter, and a standard deviation of 0.3 micron. The powder was stored at 40° C. for one month, but no blocking was observed. Next, 30 parts by weight of the power was mixed with 970 parts by weight of a ferrite carrier and employed in a copy machine (SF-8100 available from Sharp Kabushiki Kaisha) to copy a chart for test, thus obtaining a reproducible and distinct red image. No offset was also observed and the cleaning properties of the photosensitive member drum were good.

EXAMPLE 6

The same flask as in Example 1 was charged with 40.8 parts by weight of the dispersion stabilizer of Reference Example 3, 461 parts by weight of isopropanol and 154 parts by weight of 2-methoxy ethanol and heated to 80° C. After completely dissolving the contents, a mixture containing 103 parts by weight of styrene, 17.7 parts by weight of n-butyl acrylate, 4.0 parts by weight of methacrylic acid, 0.8 parts by weight of diisopropenylbenzene, 9.5 parts by weight of the dye of Reference Example 7, 1.3 parts by weight of benzoyl peroxide and 6.7 parts by weight of azobiscyclohexanenitrile was added and reacted at 80° C. for 24 hours and the reaction was terminated. It was then treated as generally described in Example 1 to obtain blue powder which was observed by an electron microscope to find spherical particles having a particle size of 5 to 7 microns. The powder has a weight average particle size of 6.1 microns when measured by a coulter counter and a standard deviation of 0.2 micron. The powder was stored at 40° C. for one month, but no blocking was observed. Next, 30 parts by weight of the power was mixed with 970 parts by weight of a ferrite carrier and employed in a copy machine (U-BIX-3000 available from Konishiroku Photo Ind. Co. Ltd.) to copy a chart for test, thus obtaining a reproducible and distinct red image. No offset was also observed and the cleaning properties of the photosensitive member drum were good.

EXAMPLE 7

The same flask as in Example 1 was charged with 12.6 parts by weight of the dispersion stabilizer of Reference Example 4, 561 parts by weight of t-butanol and 120 parts by weight of ethyleneglycol monomethyl ether acetate and heated to 90° C. Next, 15.5 parts by weight of Firstgen Blue 5,490 (copper phthalocyanine available from Dainippon Inc and Chemicals Inc.) was preliminarily ground using a table SG mill together with a mixture of 9.5 parts by weight of ethyleneglycol monomethyl ether acetate and 12.6 parts by weight of the dispersion stabilizer of Reference Example 4 and then 60 parts by weight of styrene, 25 parts by weight of t-butyl methacrylate, 15.3 parts by weight of 2-ethylhexyl acrylate, 0.5 parts by weight of 1,6-hexanediol dimethacrylate and 4.2 parts by weight of benzoyl peroxide were added to form a pigment suspension. The pigment suspension was added dropwise to the flask for 2 hours and kept at 90° C. for 10 hours. It was then treated as generally described in Example 1 to obtain blue powder which was observed by an electron microscope to find spherical particles having a particle size of 7 to 10 microns. The powder has a weight average particle size of 8.4 microns when measured by a coulter counter and a standard deviation of 0.9 microns. The powder was stored at 40° C. for one month, but no blocking was observed. Next, 30 parts by weight of the power was mixed with 970 parts by weight of a ferrite carrier and employed in a copy machine (U-BIX-3000) to copy a chart for test, thus obtaining a reproducible and distinct red image. No offset was observed and the cleaning properties of the photosensitive member drum were good.

EXAMPLE 8

The same flask as in Example 1 was charged with 6.1 parts by weight of the dispersion stabilizer of Reference Example 5, 451 parts by weight of isopropanol and 186 parts by weight of 2-ethoxyethanol and heated to 80° C. Separately, 15.5 parts by weight of carbon black available from Cabot Co., as MONARCH 880 was preliminarily ground using a table SG mill together with a mixture of 8 parts by weight of 2-ethoxyethanol and 9.1 parts by weight of the dispersion stabilizer of Reference Example 5 and added to the flask. To the flask was added another mixture of 38 parts by weight styrene, 25 parts by weight of 2-ethylhexyl acrylate and 3 parts by weight of benzoyl peroxide for one hour and kept at 80° C. for 8 hours. Further, a mixture of 33.3 parts by weight of styrene, 8.3 parts by weight of 2-ethylhexyl acrylate, 0.4 parts by weight of diisopropenylbenzene and 2.1 parts by weight of azobiscyclohexanenitrile was added dropwise over 30 minutes. It was heated to 85° C. and allowed to react for 10 hours and the reaction was terminated. It was then treated as generally described in Example 1 to obtain black powder which was observed by an electron microscope to be spherical particles having a particle size of 6 to 8 microns. The powder has a weight average particle size of 6.9 microns when measured by a coulter counter and a standard deviation of 0.8 micron. The powder was stored at 40° C. for one month, but no blocking was observed. Next, 30 parts by weight of the power was mixed with 970 parts by weight of a ferrite carrier and employed in a copy machine (SF-8100 available from Sharp Kabushiki Kaisha) to copy a chart for test, thus obtaining a reproducible and distinct black image. No offset was observed and the cleaning properties of the photosensitive member drum were good.

COMPARATIVE EXAMPLE 1

This is an example showing where the silicon content of the resin particles is less than $1 \times 10^{-1}\%$ by weight based on the amount of the resin particles.

A reaction vessel was charged with 64 parts by weight of hydroxypropylcellulose, 700 parts by weight of dioxane and 0.025 parts by weight of dibutyltin dilaurate and heated to 80° C. Then, 35 parts by weight of dioxane containing 5.02 parts by weight of gamma-mercaptopropyltrimethoxysilane was added dropwise over 30 minutes and kept at 80° C. for 4 hours. Thereafter, dioxane was collected in a reduced pressure to obtain a dioxane solution of hydroxypropylcellulose having a nonvolatile content of 20%.

Black resin particles were prepared as generally described in Example 8 with the exception that the dioxane solution of hydroxypropylcellulose obtained above was employed as a dispersion stabilizer in an amount of 25 parts by weight. The particles were observed by an electron microscope to be spherical particles having a particle size of 6 to 8 microns. The powder has a weight average particle size of 7.2 microns when measured by a coulter counter, and a standard deviation of 1.1 microns. The powder was stored at 40° C. for one month and a little blocking was observed, but no trouble occured. Next, 30 parts by weight of the power was mixed with 970 parts by weight of a ferrite carrier and employed in a copy machine (SF-8100 available from Sharp Kabushiki Kaisha) to copy a chart for test, thus obtaining a reproducible and distinct black image. A little offset was observed and the cleaning properties of the photosensitive member drum were not good.

What is claimed is:

1. Resin particles substantially spherical in shape having a weight average particle size of 1 to 30 microns and containing a carbon atom as main component, a silicon atom in an amount of $1 \times 10^{-1}$ to 7% by weight and/or a fluorine atom in an amount of $1 \times 10^{-2}$ to 2% by weight; the particles being prepared by polymerizing a polymerizable monomer in an organic solvent having a higher solubility parameter than the resultant polymer by at least 1.0 in the presence of a dispersion stabilizer which is soluble in said organic solvent and which has a dialkylsiloxane bond and/or a fluorine atom, and then removing said organic solvent; wherein said resin particles have said dispersion stabilizer on the surface of said resin particles.

2. The particles according to claim 1 wherein said dispersion stabilizer contains 1 to 35% by weight of a silicon atom and is present in an amount of 1 to 20% by weight based on an amount of the polymerizable monomer.

3. The particles according to claim 1, wherein said dispersion stabilizer contains $1 \times 10^{-1}$ to 20% by weight of a fluorine atom and is present in an amount of 1 to 20% by weight based on an amount of the polymerizable monomer.

4. The particles according to claim 1 wherein the polymerization reaction is conducted in the presence of a coloring agent.

* * * * *